US012654268B2

(12) United States Patent
Hikita et al.

(10) Patent No.:  US 12,654,268 B2
(45) Date of Patent:      Jun. 16, 2026

(54) MACHINE TOOL

(71) Applicant: DMG MORI CO., LTD., Nara (JP)

(72) Inventors: Isao Hikita, Nara (JP); Akihisa Aoyama, Nara (JP); Tetsushi Asada, Nara (JP)

(73) Assignee: DMG MORI CO., LTD., Nara (JP)

( * ) Notice: Subject to any disclaimer, the term of this patent is extended or adjusted under 35 U.S.C. 154(b) by 622 days.

(21) Appl. No.: 18/017,137

(22) PCT Filed: Apr. 26, 2021

(86) PCT No.: PCT/JP2021/016580
§ 371 (c)(1),
(2) Date: Jan. 20, 2023

(87) PCT Pub. No.: WO2022/018923
PCT Pub. Date: Jan. 27, 2022

(65) Prior Publication Data
US 2023/0264310 A1      Aug. 24, 2023

(30) Foreign Application Priority Data

Jul. 20, 2020     (JP) ................................. 2020-123473

(51) Int. Cl.
*B23Q 3/155*         (2006.01)
*B23Q 3/157*         (2006.01)
*B23B 29/24*         (2006.01)

(52) U.S. Cl.
CPC ...... *B23Q 3/15539* (2016.11); *B23Q 3/15534* (2016.11); *B23Q 3/1554* (2013.01);
(Continued)

(58) Field of Classification Search
CPC ............ B23Q 3/15539; B23Q 3/15534; B23Q 3/1554; B23Q 3/15722;
(Continued)

(56) References Cited

U.S. PATENT DOCUMENTS 9,481,062 B2 * 11/2016 Scheffler ............ B23Q 3/15573
2006/0189464 A1 *  8/2006 Corbean ............ B23Q 3/15533
                                                              483/68
(Continued)

FOREIGN PATENT DOCUMENTS

EP          0900627 A2     3/1999
EP          2277658 B1     8/2013
(Continued)

OTHER PUBLICATIONS

Extended European Search Report for related Application No. 21845616.8; report dated Nov. 29, 2023.
(Continued)

*Primary Examiner* — Ryan J. Walters

(57)              ABSTRACT

The present invention includes a tool magazine (10) storing a plurality of tools (T), a turret (3) to which a plurality of tools (T) are attached, and a tool changer (20) changing a tool (T) attached to the turret (3) for a tool (T) stored in the tool magazine (10). The tool changer (20) has two tool grippers for gripping tools (T) and replaces tools (T) attached to the turret (3) with one another using the two tool grippers based on tool information stored in a tool information storage (43) under control by a tool change control unit (42).

6 Claims, 7 Drawing Sheets

(52) U.S. Cl.
CPC .......... *B23Q 3/15722* (2016.11); *B23B 29/24* (2013.01); *B23Q 2003/155414* (2016.11); *B23Q 2003/155418* (2016.11); *B23Q 2003/155428* (2016.11); *B23Q 2003/155435* (2016.11); *B23Q 2003/15586* (2013.01)

(58) Field of Classification Search
CPC ....... B23Q 2003/155414; B23Q 2003/155418; B23Q 2003/155428; B23Q 2003/155435; B23Q 2003/15586; B23B 29/24
See application file for complete search history.

(56) References Cited

U.S. PATENT DOCUMENTS

| | | | | |
|---|---|---|---|---|
| 2007/0184954 | A1* | 8/2007 | Muser | B23Q 3/15773 483/1 |
| 2015/0018179 | A1* | 1/2015 | Scheffler | B23Q 3/1554 483/22 |
| 2023/0103884 | A1* | 4/2023 | Asada | B23B 3/16 483/66 |
| 2023/0118193 | A1* | 4/2023 | Asada | B23Q 3/15534 483/4 |
| 2023/0241734 | A1* | 8/2023 | Aoyama | B23Q 3/1572 483/7 |
| 2023/0278152 | A1* | 9/2023 | Aoyama | B23Q 3/15503 483/58 |

FOREIGN PATENT DOCUMENTS

| | | | |
|---|---|---|---|
| JP | S5627754 | A * | 3/1981 |
| JP | S6268202 | A | 3/1987 |
| JP | H05269635 | A | 10/1993 |
| JP | H06320375 | A | 11/1994 |
| JP | 2003145379 | A | 5/2003 |
| JP | 2010234449 | A | 10/2010 |
| JP | 2016002644 | A | 1/2016 |
| SU | 1135593 | A1 | 1/1985 |

OTHER PUBLICATIONS

International Search Report for related Application No. PCT/JP2021/016580; report dated May 25, 2021.

* cited by examiner

F I G. 7

| Workpiece No. | Tool Arrangement in Turret | | | | | | | |
|---|---|---|---|---|---|---|---|---|
| | ST1 | ST2 | ST3 | ST4 | ST5 | ST6 | ST7 | ST8 |
| W1 | T7 | T8 | T9 | T10 | T11 | T12 | T13 | T14 |
| W2 | T15 | T7 | T8 | T9 | T10 | T11 | T12 | T13 |
| ⋮ | ⋮ | ⋮ | ⋮ | ⋮ | ⋮ | ⋮ | ⋮ | ⋮ |

F I G. 8

| Tool Arrangement in Tool Magazine | | | | | | | | |
|---|---|---|---|---|---|---|---|---|
| P1 | P2 | P3 | P4 | · · · | P13 | P14 | P15 | P16 |
| T1 | T2 | T3 | T4 | · · · | - | - | T15 | T16 |

F I G. 9
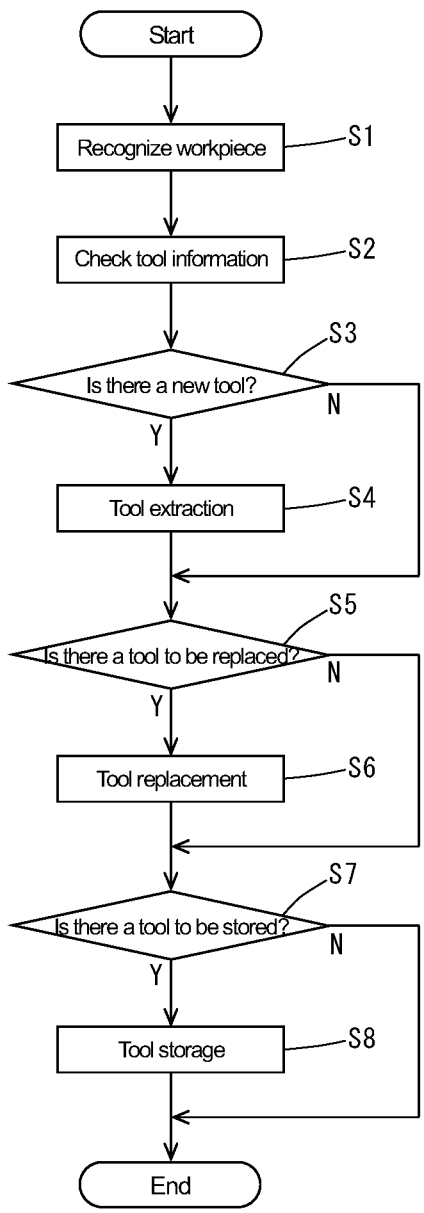

MACHINE TOOL

TECHNICAL FIELD

The present invention relates to a machine tool that includes a tool magazine storing tools, a turret to which tools are attached, and a tool changer changing a tool attached to the turret for a tool stored in the tool magazine.

BACKGROUND ART

A known example of the machine tool is a numerically controlled lathe with a tool changer disclosed in Japanese Unexamined Patent Application Publication No. S56-27754 (Patent Literature 1). This disclosed lathe has a body, a headstock mounted on the body, a spindle rotatably incorporated in the headstock, a tool rest moving in a direction parallel to the axis of the spindle or a direction perpendicular to the axis of the spindle, a turret having tools and supported on the tool rest to be turnable about an axis of rotation parallel to the axis of the spindle, and a tool storage magazine disposed on the tool rest or near the body and having tool holding units for holding internal machining tools.

The turret has a tool receiving device provided thereon, which is able to removably hold only an internal machining tool. Behind the turret, a tool attachment/removal driving device is provided on the tool rest, which becomes concentric with the tool receiving device when the tool receiving device is indexed to a tool change preparation position. When the tool receiving device is indexed at the tool change preparation position, attachment an removal of an internal machining tool to and from the tool receiving device is enabled by the tool attachment/removal driving device.

The tool storage magazine is turnably supported and is configured to be turned by an appropriate turn driving device. By this turning of the tool storage magazine, a desired internal machining tool is indexed to a tool change position.

Between the turret and the tool storage magazine, a tool change arm is provided. The tool change arm is configured to be moved forward and backward in a direction parallel to the axis of rotation of the turret and turned about an axis of rotation parallel to the axis of rotation of the turret by an appropriate driving device.

Through forward and backward movement and turning of the tool change arm that are driven by the driving device, an internal machining tool held by the tool receiving device at the tool change preparation position and an internal machining tool stored in the tool storage magazine and indexed at the tool change position are exchanged.

CITATION LIST

Patent Literature

Patent Literature 1: Japanese Unexamined Patent Application Publication No. S56-27754

SUMMARY OF INVENTION

Technical Problem

In recent years, various types of machining have been performed in the lathe as described above. Therefore, besides turning tools such as an external machining tool and an internal machining tool, rotary tools such as a drill, a tap, and an end mill are sometimes attached to the turret.

The necessary tools differ depending on a workpiece to be machined, i.e., the type of machining to be performed on the workpiece. Therefore, the types of the tools to be attached to the turret differ depending on the workpiece and the positions on which the tools should be arranged in the turret also differ depending on the workpiece.

If the operation of arranging the necessary tools in the turret such that the tools that are determined depending on the workpiece to be machined are arranged on their respective appropriate positions in the turret is carried out automatically by the tool changer inclusive of not only tool change between the tool magazine and the turret but also replacement of tools within the turret, the arranging operation is further streamlined, which is preferable.

However, the above-described conventional tool changer is able to carry out tool change between the tool magazine and the turret but does not have the function of replacing tools within the turret; therefore, the conventional tool changer cannot realize such tool replacement. Consequently, the conventional tool changer has to rely on an operator's manual operation with respect to replacement of tools within the turret, so that streamlining of the arranging operation is not achieved.

The present invention has been achieved in view of the above-described circumstances, and an object of the invention is to provide a machine tool having a tool changer able to replace tools within a turret.

Solution to Problem

To solve the above-described problem, the present invention provides a machine tool including a tool magazine storing a plurality of tools, a turret to which a plurality of tools are attached, and a tool changer configured to change a tool attached to the turret for a tool stored in the tool magazine, wherein the tool changer has two tool grippers for gripping tools and is configured to be able to replace tools attached to the turret with one another using the tool grippers.

In this machine tool, the tool changer has two tool grippers for gripping tools and is configured to be able to replace tools attached to the turret with one another using the tool grippers. Therefore, this tool changer is not only able to carry out tool change between the tool magazine and the turret but also able to carry out the tool change inclusive of replacement of tools within the turret. Further, carrying out the tool change inclusive of replacement of tools within the turret automatically with the tool changer without relying on an operator's manual operation enables streamlining of the operation of arranging tools in the turret.

In the present invention, the tool changer may be configured to, when changing attachment positions of n tools of the tools attached to the turret, first grip and pull out with an empty first one of the tool grippers a first tool selected from among tools to be transferred, subsequently carry out an operation of gripping and pulling out with an empty second one of the tool grippers a second tool attached to a transfer destination to which the first tool is to be transferred and then attaching the first tool to the transfer destination, and thereafter repeat the operation (n−2) times and then attach an nth tool to a transfer destination for the nth tool. Note that n is a natural number of 2 or greater.

With the tool changer having this configuration, when changing the attachment positions of n tools (replacing n tools), the tool changer first grips and pulls out with an empty first one of the tool grippers a first tool attached to a transfer source. Subsequently, the tool changer grips and pulls out with an empty second one of the tool grippers a second tool attached to a transfer destination to which the pulled-out first tool is to be transferred, and then attaches the first tool gripped with the first tool gripper to the transfer destination.

Subsequently, the tool changer grips and pulls out with the empty first tool gripper a third tool attached to a transfer destination to which the second tool is to be transferred, and then attaches the second tool gripped with the second tool gripper to the transfer destination.

Thereafter, the tool changer repeats such a replacing operation necessary times. Lastly, the tool changer attaches an nth tool to a transfer destination for the nth tool, by which the tool changer ends the tool replacement within the turret.

In the present invention, the tool changer may be configured to, when changing attachment positions of n tools of the tools attached to the turret, first grip and pull out with an empty first one of the tool grippers a first tool selected from among tools to be transferred, subsequently carry out an operation of gripping and pulling out with an empty second one of the tool grippers a second tool to be transferred to a position where the first tool was attached and attaching the second tool to the position where the first tool was attached, and thereafter repeat (n−2) times an operation of gripping and pulling out with the empty second tool gripper an (i+1)th tool to be transferred to a position where an ith tool was attached and attaching the (i+1)th tool to the position where the ith tool was attached and then attach the first tool gripped with the first tool gripper to a position where an nth tool was attached. Note that n is a natural number of 2 or greater and i is a natural number of 2 to (n−1).

With the tool changer having this configuration, when changing the attachment positions of n tools (replacing n tools), the tool changer first grips and pulls out with an empty first one of the tool grippers a first tool selected from among tools to be transferred. Subsequently, the tool changer grips and pulls out with an empty second one of the tool grippers a second tool to be transferred to a position where the first tool was attached, and attaches the pulled-out second tool to the position where the first tool was attached.

Subsequently, the tool changer grips and pulls out with the empty second tool gripper a third tool to be transferred to a position where the second tool was attached, and then attaches the third tool to the position where the second tool was attached.

Thereafter, the tool changer repeats necessary times an operation of gripping and pulling out with the empty second tool gripper an (i+1)th tool to be transferred to a position where an ith tool was attached and attaching the (i+1)th tool to the position where the ith tool was attached. Lastly, the tool changer attaches the first tool gripped with the first tool gripper to a position where an nth tool was attached, by which the tool changer ends the tool replacement within the turret.

In the present invention, the tool changer may be configured to, when changing attachment positions of n tools of the tools attached to the turret, storing one tool of the n tools into the tool magazine, and attaching one new tool from the tool magazine to the turret, grip with an empty first one of the tool grippers a first tool as the new tool to be attached from the tool magazine to the turret, subsequently carry out an operation of gripping and pulling out with an empty second one of the tool grippers a second tool attached to a transfer destination to which the first tool is to be transferred and then attaching the first tool to the transfer destination, and thereafter repeat the operation (n−2) times and then store an nth tool as the tool to be stored into the tool magazine into the tool magazine. Note that n is a natural number of 2 or greater.

With the tool changer having this configuration, when changing the attachment positions of n tools (replacing n tools) of the tools attached to the turret, storing one tool of the n tools into the tool magazine, and attaching one new tool from the tool magazine to the turret, the tool changer first grips with an empty first one of the tool grippers a first tool as the new tool to be attached from the tool magazine to the turret. Subsequently, the tool changer grips and pulls out with an empty second one of the tool grippers a second tool attached to a transfer destination to which the first tool is to be transferred, and then attaches the first tool to the transfer destination.

Subsequently, the tool changer grips and pulls out with the empty first tool gripper a third tool attached to a transfer destination to which the second tool is to be transferred, and then attaches the second tool gripped with the second tool gripper to the transfer destination.

Thereafter, the tool changer repeats such a replacing operation necessary times. Lastly, the tool changer stores an nth tool as the tool to be stored in the tool magazine into the tool magazine, by which the tool changer ends the tool replacement.

Furthermore, in the present invention, the tool changer may be configured to be able to turn the two tool grippes about an axis of rotation perpendicular to a longitudinal direction of a tool gripped with each of the tool grippers. The tool changer having this configuration enables an efficient tool replacement.

Advantageous Effects of Invention

As described above, the present invention enables tools attached to the turret to be replaced with one another automatically. Therefore, in comparison with the conventional tool changer that has to rely on an operator's manual operation with respect to the tool replacement, the present invention achieves streamlining of the tool replacement and thereby realizes an efficient replacement.

BRIEF DESCRIPTION OF DRAWINGS

FIG. 7 shows an example of a data table stored in a tool information storage in the embodiment, wherein the data table shows a tool replacement relationship in the turret;

FIG. 8 shows an example of another data table stored in the tool information storage in the embodiment, wherein the data table shows information on tool attachment in the tool magazine; and FIG. 9 is a flowchart illustrating a procedure in a tool change control unit in the embodiment.

DESCRIPTION OF EMBODIMENTS

Hereinafter, a specific embodiment of the present invention will be described with reference to the drawings.

Figure 1:
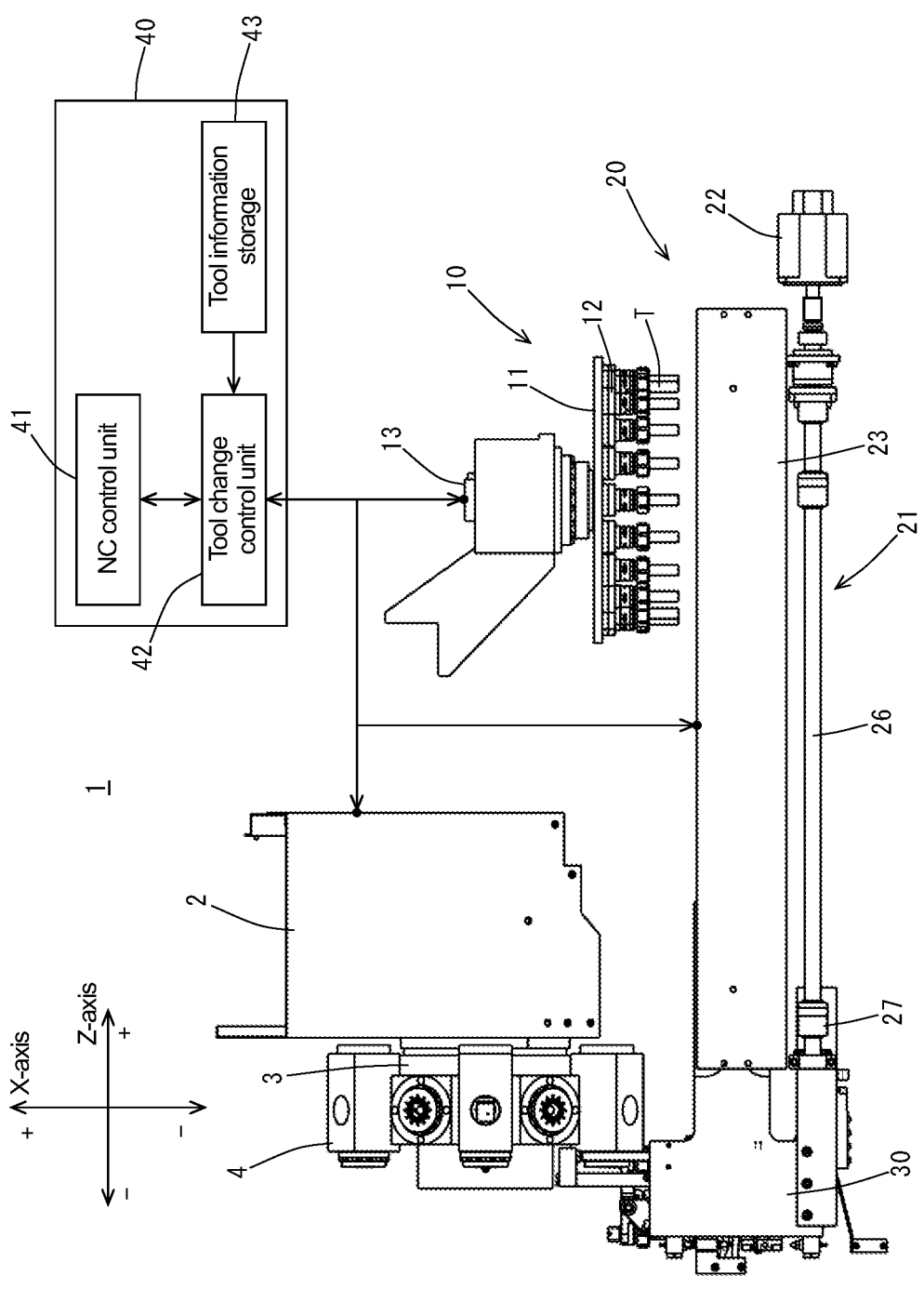
FIG. 1 is a plan view schematically illustrating a configuration of a machine tool according to an embodiment of the present invention.

As illustrated in FIG. 1, a machine tool 1 according to this embodiment is a lathe that includes a controller 40 and is operationally controlled by the controller 40. The machine tool 1 includes, besides the controller 40, a tool rest 2 arranged to be movable along X-axis and Z-axis orthogonal to each other, a turret 3 supported on a front end surface (an end surface located on the minus side in the Z-axis direction) of the tool rest 2 to be rotatable in the direction of arrow B-C about an axis parallel to the Z-axis, a tool magazine 10 arranged on the rear side (the plus side in the Z-axis direction) of the tool rest 2, and a tool changer 20 arranged to be connectable to the turret 3 and the tool magazine 10 to transport tools T between them.

The turret 3 is composed of a prismatic member and has attached thereto, e.g., to its outer peripheral flat surfaces, tool holders 4 for holding tools T. The tool holders 4 are each of a type configured to hold a tool T along the Z-axis or of a type configured to hold a tool T along the radial direction. These types of tool holders 4 are attached in a mixed manner to the turret 3.

Figure 2:
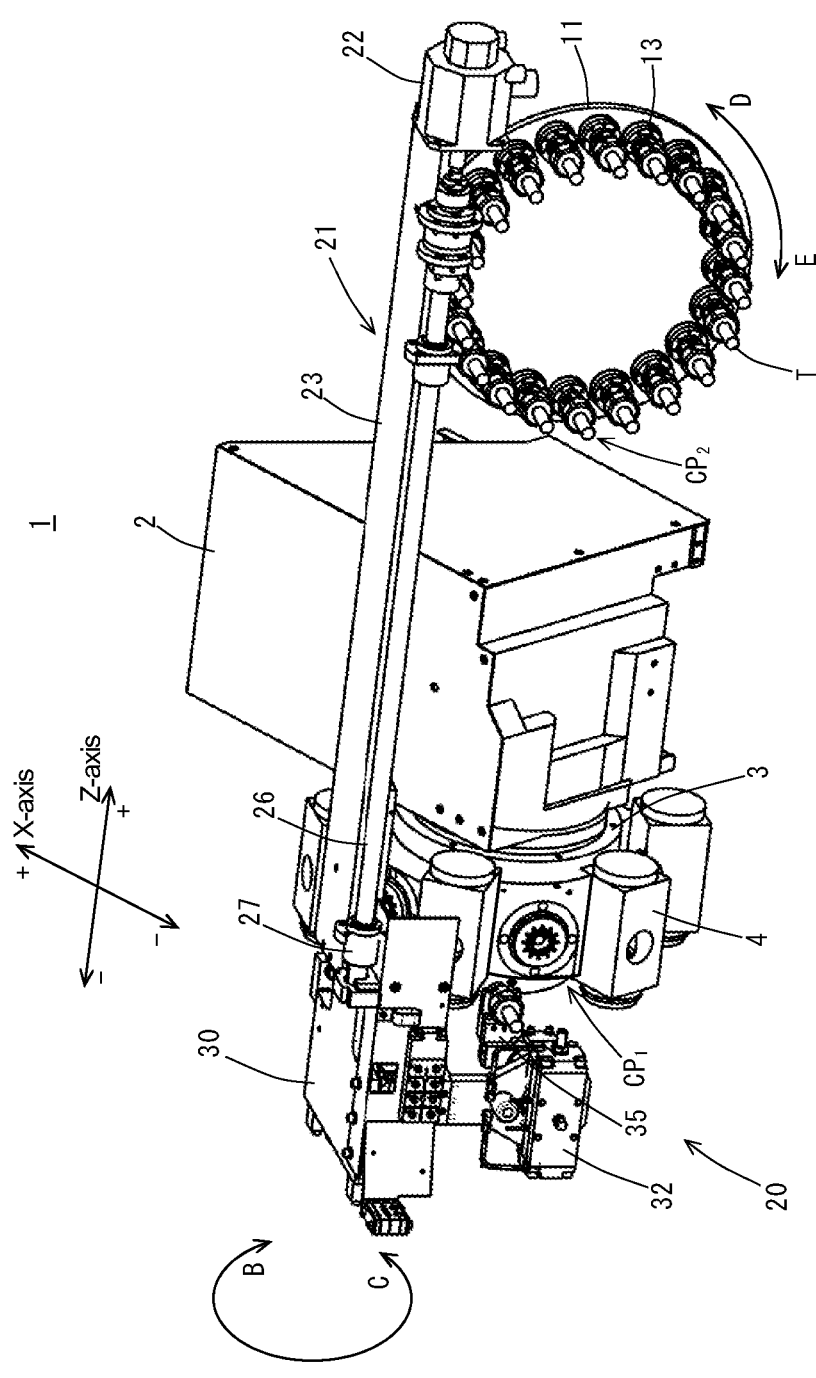
FIG. 2 is a perspective view of the machine tool illustrated in FIG. 1.

In this embodiment, the position $CP_1$ indicated in FIG. 2 is an attachment/removal position for attaching and removing tools T to and from the tool holders 4. Each tool holder 4 is indexed to the attachment/removal position $CP_1$ by the turret 3 being rotated in the direction of arrow B-C. At the attachment/removal position $CP_1$, attachment and removal of a tool T to and from a tool holder 4 of the type configured to hold the tool T along the Z-axis is performed from the minus side in the Z-axis direction, while attachment and removal of a tool T to and from a tool holder 4 of the type configured to hold the tool T along the radial direction is performed from the minus side in the X-axis direction.

The tool magazine 10 has a holding plate 11 composed of a circular plate member and arranged to be rotatable in the direction of arrow D-E about an axis parallel to the X-axis, holding pots 12 arranged at equal intervals along the outer periphery of the holding plate 11 on the peripheral edge of the holding plate 11, and a drive motor 13 rotating the holding plate 11. The holding pots 12 are each configured to hold a tool T and mounted on the holding plate 11 to protrude to the minus side in the X-axis direction. In this embodiment, the position $CP_2$ indicated in FIG. 2 is an attachment/removal position for attaching and removing tools T to and from the holding pots 12. Each holding pot 12 is indexed to the attachment/removal position $CP_2$ by the holding plate 11 being driven and rotated by the drive motor 13.

The tool changer 20 is arranged on the minus side in the X-axis direction with respect to the tool rest 2 and the tool magazine 10. The tool changer 20 has a feed mechanism 21 arranged along the Z-axis, a movable carriage 30 configured to move along the Z-axis by being driven by the feed mechanism 21, and a first hand 34 and a second hand 35 mounted on the movable carriage 30.

The feed mechanism 21 is constituted by a rail holding base 23 arranged parallel to and along the Z-axis, two guide rails 24 mounted parallel to each other along the Z-axis on a lower surface of the rail holding base 23, sliders 25 provided two for each of the guide rails 24 and engaged with the guide rails 24, a ball screw 26 arranged along the rail holding base 23, a ball nut 27 screwed on the ball screw 26, and a servo motor 22 coupled to an end of the ball screw to cause the ball screw 26 to rotate about the axis thereof. The sliders 25 are fixed on an upper surface of the movable carriage 30.

The movable carriage 30 has a holding member 31 on a lower surface thereof, which is arranged to extend downward from the movable carriage 30 and is rotatable in the direction of arrow F-G about an axis perpendicular to both the X-axis and the Z-axis and movable in a direction extending along the X-axis. The holding member 31 is configured to move along the X-axis by being driven by a movement cylinder 36 and turn within the angle range of 90° in the direction of arrow F-G by being driven by a drive cylinder 37 via a mechanism such as a rack and pinion mechanism.

On the holding member 31, a rotating shaft 33 is mounted such that the rotating shaft 33 penetrates the holding member 31 along the X-axis and is rotatable in the direction of arrow J-K. The rotating shaft 33 is configured to rotate within the angle range of 180° in the direction of arrow J-K by being driven by a drive cylinder 32 via a mechanism such as a rack and pinion mechanism.

On the end located on the minus side in the X-axis direction of the rotating shaft 33, the first hand 34 and the second hand 35 are mounted such that they are located above and below point-symmetrically to each other with respect to the axial center of the rotating shaft 33 and parallel to each other. The first hand 34 and the second hand 35 have the same configuration. The first hand 34 has a pair of gripping jaws 34a for gripping a tool T, and the tool T is to be inserted between and pulled out of the gripping jaws 34a through an opening of the gripping jaws 34a. The second hand 35 has a pair of gripping jaws 35a for gripping a tool T, and the tool T is to be inserted between and pulled out of the gripping jaws 35a through an opening of the gripping jaws 35a.

The first hand 34 and the second hand 35 are configured to be in a position having the gripping jaws 34a and 35a along the Z-axis direction when the holding member 31 is at the end of rotation in the F direction and be in a position having the gripping jaws 34a and 35a along the X-axis direction when the holding member 31 is at the end of rotation in the G direction. In this embodiment, the first hand 34 and the second hand 35 are each configured to, when the holding member 31 is at the end of rotation in the F direction, have the opening of the gripping jaws 34a, 35a on the plus side in the Z-axis direction when located above and have the opening of the gripping jaws 34a, 35a on the minus side in the Z-axis direction when located below.

In this embodiment, a tool T held by a holding pot 12 indexed at the attachment/removal position $CP_2$ in the tool magazine 10 can be gripped with the upper one of the first hand 34 and second hand 35 of the tool changer 20 with the holding member 31 positioned at the end of movement in the minus X direction (this position is referred to as "first X position") and positioned at the end of rotation in the F direction.

Further, when, for example, the first hand 34 is located above and gripping a tool T with the gripping jaws 34a and a holding pot 12 holding no tool T is indexed at the attachment/removal position $CP_2$, the tool T gripped by the first hand 34 can be stored into the empty holding pot 12 at the attachment/removal position $CP_2$ in accordance with a storing operation as described below.

That is, assuming that the movable carriage 30 is positioned at an intermediate position between the turret 3 and the tool magazine 10, the movable carriage 30 is first moved in the plus Z direction with the holding member 31 having been moved to the end of movement in the plus X direction (this position is referred to as "second X position") and having been rotated to the end of rotation in the F direction so that the axial center of the tool T gripped by the first hand 34 is brought into coincidence with the axial center of the holding pot 12 in the Z-axis direction (this position in the Z-axis direction is referred to as "first Z position"). Subsequently, the holding member 31 is moved to the first X position in the minus X direction, so that the tool T gripped by the first hand 34 is attached to the empty holding pot 12 at the attachment/removal position $CP_2$. Subsequently, the movable carriage 30 is moved by a predetermined distance in the minus Z direction (this position is referred to as "second Z position"), so that the gripping of the tool T by the gripping jaws 34$a$ of the first hand 34 is released.

On the other hand, when, for example, the first hand 34 is located above and holding no tool T with the gripping jaws 34$a$ and a holding pot 12 holding a tool T is indexed at the attachment/removal position $CP_2$, the tool T attached to the holding pot 12 at the attachment/removal position $CP_2$ can be gripped and extracted from the holding pot 12 by the first hand 34 in accordance with an extracting operation as described below.

That is, assuming that the movable carriage 30 is positioned at an intermediate position between the turret 3 and the tool magazine 10, the movable carriage 30 is first moved to the second Z position with the holding member 31 having been rotated to the end of rotation in the F direction. Subsequently, the holding member 31 is moved to the first X position and then the movable carriage 30 is moved to the first Z position. Thereby, the tool T attached to the holding pot 12 at the attachment/removal position $CP_2$ is relatively inserted between the pair of gripping jaws 34$a$ through the opening of the gripping jaws 34$a$, so that the tool T is gripped with the gripping jaws 34$a$. Subsequently, the holding member 31 is moved to the second X position. Thereby, the tool T attached to the holding pot 12 is extracted from the holding pot 12 while being gripped with the pair of gripping jaws 34$a$.

In this embodiment, where a tool holder 4 of the type configured to hold a tool T along the radial direction is indexed at the attachment/removal position $CP_1$ in the turret 3, a tool T held by the tool holder 4 can be gripped by the lower one of the first hand 34 and second hand 35 of the tool changer 20 with the holding member 31 positioned at the first X position and positioned at the end of rotation in the F direction.

Further, when, for example, the first hand 34 is located above and holding a tool T and the second hand 35 is located below and holding no tool T and the tool holder 4 indexed at the attachment/removal position $CP_1$ is holding the tool T, the tool T gripped by the first hand 34 and the tool T held by the tool holder 4 at the attachment/removal position $CP_1$ can be exchanged in accordance with a first exchanging operation as described below.

That is, assuming that the movable carriage 30 is positioned at an intermediate position between the turret 3 and the tool magazine 10, the movable carriage 30 is first moved to a predetermined position in the minus Z direction (this position is referred to as "third Z direction") with the holding member 31 having been rotated to the end of rotation in the F direction and having been moved to the second X position. Note that the third Z position is a position such that the second hand 35 located below is positioned on the plus side in the Z-axis direction with respect to the tool T held by the tool holder 4, in other words, positioned before the tool T so as not to interfere with the tool T, when the holding member 31 is moved to the first X position.

Subsequently, the holding member 31 is moved to the first X position and then the movable carriage 30 is moved to a predetermined position in the minus Z direction (this position is referred to as "fourth Z position"). Thereby, the tool T attached to the tool holder 4 at the attachment/removal position $CP_1$ is relatively inserted between the pair of gripping jaws 35$a$ through the opening of the gripping jaws 35$a$, so that the tool T is gripped with the gripping jaws 35$a$. Subsequently, the holding member 31 is moved to the second X position, so that the tool T attached to the tool holder 4 is removed from the tool holder 4 while being gripped with the pair of gripping jaws 35$a$.

Subsequently, the rotating shaft 33 is rotated by the drive cylinder 32 to reverse the first and second hands 34 and 35 vertically, so that the second hand 35 is located above and the first hand 34 is located below. Thereafter, the holding member 31 is moved to the first X position. Thereby, the tool T gripped by the first hand 34 is attached to the tool holder 4 at the attachment/removal position $CP_1$. Subsequently, the movable carriage 30 is moved to the third Z position, so that the gripping of the tool T by the first hand 34 is released. In accordance with this first exchanging operation, the tool T gripped by the first hand 34 and the tool T held by the tool holder 4 at the attachment/removal position $CP_1$ are exchanged. Note that the too T gripped by the second hand 35 can be stored into the tool magazine 10 in accordance with the above-described storing operation.

Figure 3:
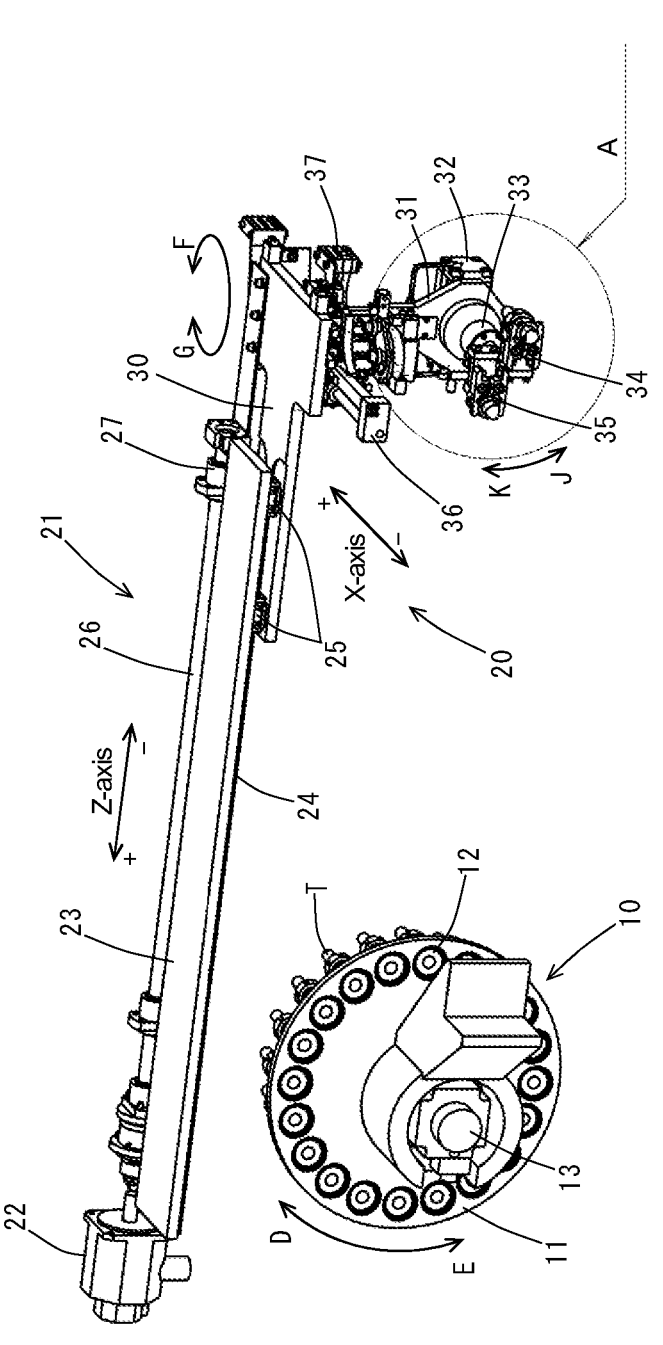
FIG. 3 is a perspective view illustrating a tool magazine and a tool changer in the embodiment.
Figure 4:
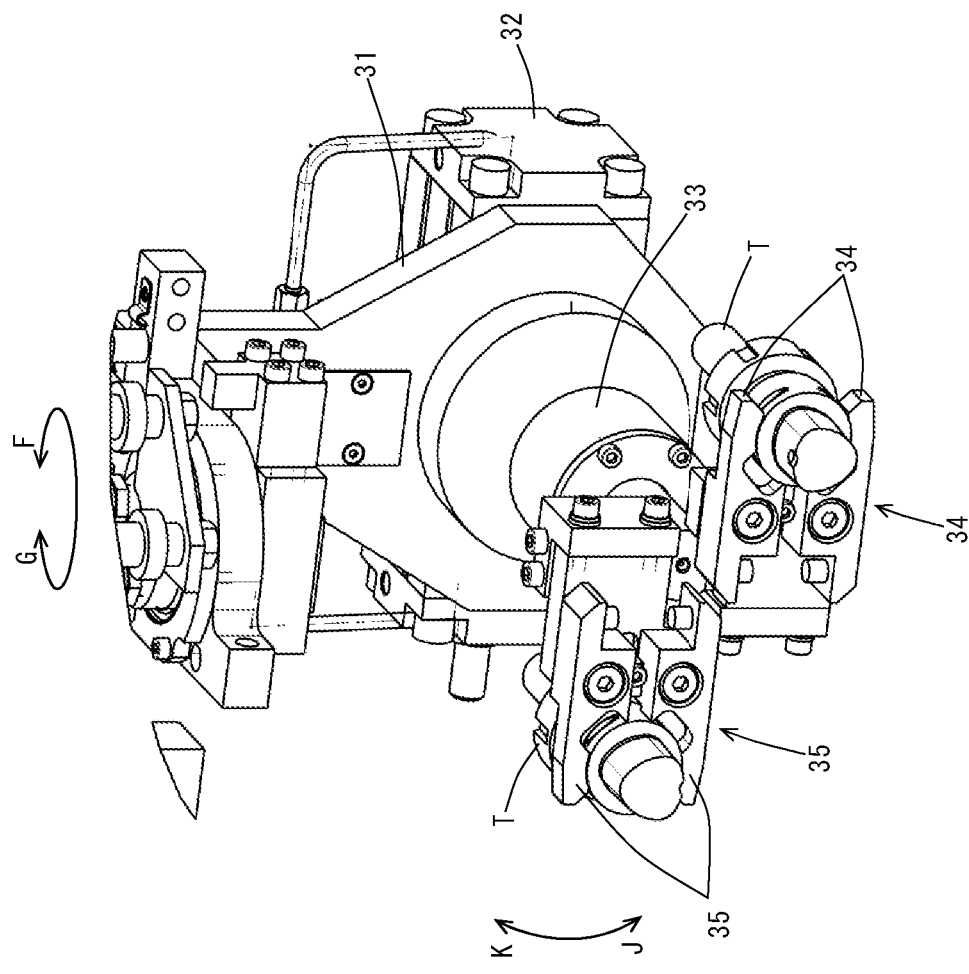
FIG. 4 is a perspective view illustrating tool grippers of the tool changer in the embodiment, which is an enlarged perspective view of the circled area A in FIG. 3.

On the other hand, where a tool holder 4 of the type configured to hold a tool T along the Z-axis is indexed at the attachment/removal position $CP_1$ in the turret 3, a tool T held by the tool holder 4 can be gripped by the lower one of the first hand 34 and second hand 35 of the tool changer 20 with the holding member 31 positioned at the end of rotation in the G direction (i.e., having been turned 90° in the G direction from the position shown in FIG. 3) and positioned at the first X position.

Further, when, for example, the first hand 34 is located above and gripping a tool T and the second hand 35 is located below and gripping no tool T and the tool holder 4 indexed at the attachment/removal position $CP_1$ is holding a tool T, the tool T gripped by the first hand 34 and the tool T held by the tool holder 4 at the attachment/removal position $CP_1$ can be exchanged in accordance with a second exchanging operation as described below.

That is, assuming that the movable carriage 30 is positioned at an intermediate position between the turret 3 and the tool magazine 10, the movable carriage 30 is first moved to the third Z position in the minus Z direction with the holding member 31 having been rotated to the end of rotation in the G direction and having been moved to the second X position. In this process, the second hand 35 is positioned to a position the Z-axis direction such that the second hand 35 can grip the tool T held by the tool holder 4.

Subsequently, the holding member 31 is moved to the first X position. Thereby, the tool T attached to the tool holder 4 at the attachment/removal position $CP_1$ is relatively inserted between the pair of gripping jaws 35$a$ through the opening of the gripping jaws 35$a$, so that the tool T is gripped with the gripping jaws 35$a$. Subsequently, the holding member 31 is moved to the fourth Z position in the minus Z direction, so that the tool T attached to the tool holder 4 is removed from the tool holder 4 while being gripped with the pair of gripping jaws 35$a$.

Subsequently, the rotating shaft 33 is rotated by the drive cylinder 32 to reverse the first and second hands 34 and 35 vertically, so that the second hand 35 is located above and the first hand 34 is located below. Thereafter, the movable carriage 30 is moved to the third Z position. Thereby, the tool T gripped by the first hand 34 is attached to the tool holder 4 at the attachment/removal position $CP_1$. Subsequently, the holding member 31 is moved to the second X position, so that the gripping of the tool T by the first hand 34 is released. In accordance with this second exchanging operation, the tool T gripped by the first hand 34 and the tool T held by the tool holder 4 at the attachment/removal position $CP_1$ are exchanged. Note that the too T gripped by the second hand 35 can be stored into the tool magazine 10 in accordance with the above-described storing operation.

The controller 40 is composed of a computer including a CPU, a RAM, and a ROM and has, at least, an NC control unit 41, a tool change control unit 42, and a tool information storage 43.

The NC control unit 41 controls operations of the motion mechanisms, e.g., the tool rest 2 and the turret 3, of the lathe 1. The tool information storage 43 is a functional unit that stores information relevant to tool replacement in the form of a data table, for example, stores data as shown in FIGS. 7 and 8. This information is, for example, input from the outside of the controller 40 and stored into the tool information storage 43.

The tool change control unit 42 controls operations of the tool magazine 10 and tool changer 20 based on the data stored in the tool information storage 43 upon receipt of a tool change command from the NC control unit 41 so as to cause the tool changer 20 to carry out tool replacement that is inclusive of the above-described extracting operation, storing operation, and first and second exchanging operations.

Figure 5:
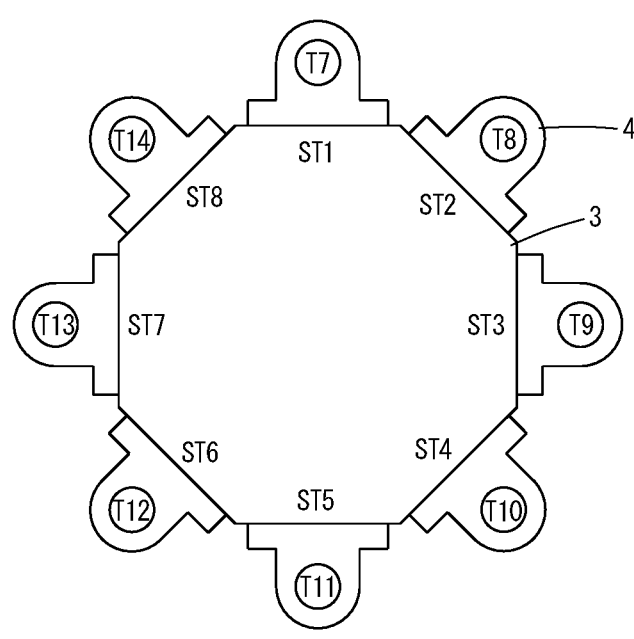
FIG. 5 is an illustrative diagram illustrating an example of tool attachment positions in a turret in the embodiment.
Figure 6:
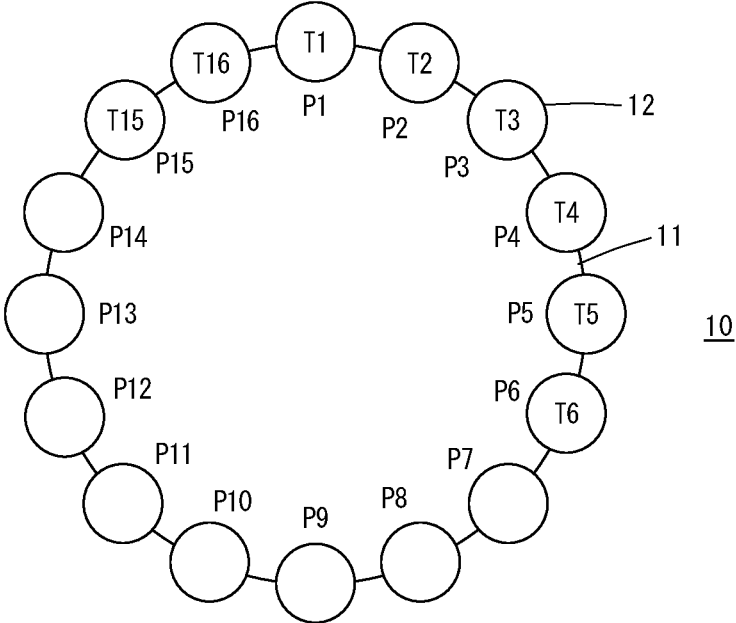
FIG. 6 is an illustrative diagram illustrating an example of tool attachment positions in the tool magazine in the embodiment.

FIG. 7 shows arrangement data indicative of arrangement of tools T in the turret 3 for individual workpieces. FIG. 8 shows arrangement data indicative of arrangement of tools T in the tool magazine 10. In FIG. 7, ST1 to ST8 are numbers of attachment positions (stations) in the turret 3 (see FIG. 5). Further, T7 to T9, T13, and T14 are tool numbers that are specific numbers assigned to individual tools. In FIG. 8, P1 to P16 are numbers (specific numbers) of the holding pots in the tool magazine 10 (see FIG. 6). FIG. 5 is an illustrative diagram that schematically illustrates arrangement of tools T in the turret 3 and FIG. 6 is an illustrative diagram that schematically illustrates arrangement of tools T to be stored into the tool magazine 10. In this embodiment, for the sake of convenience, each tool T is to be stored into the holding pot 12 of the same number.

The tool change control unit 42 executes the process illustrated in FIG. 9. Specifically, the tool change control unit 42 starts the process upon receipt of the tool change command from the NC control unit 41. The tool change control unit 42 first recognizes the type of the workpiece to be machined from the NC control unit 41 (step S1). Note that, in this example, the workpiece to be machined has been changed from a previous workpiece W1 to a subsequent workpiece W2.

Subsequently, the tool change control unit 42 obtains, by referring to the data table shown in FIG. 7 that is stored in the tool information storage 43, the types of the tools to be used in machining of the workpiece W2 and information on arrangement of the tools T in the turret 3 (step S2). The tool change control unit 42 further recognizes, by comparing the types of the tools to be used in machining of the workpiece W2 with the types of the tools used is machining of the workpiece W1, the presence or absence of a new tool, the presence or absence of a tool to be stored, and a tool to be replaced.

In this example, the tool T15 is recognized as a new tool and the tool T14 is recognized as a tool to be stored. The tool T7 at ST1 is to be transferred to ST2, the tool T8 at ST2 is to be transferred to ST3, the tool T9 at ST3 is to be transferred to ST4, the tool T10 at ST4 is to be transferred to ST5, the tool T11 at ST5 is to be transferred to ST6, the tool T12 at ST6 is to be transferred to ST7, and the tool T13 at ST7 is to be transferred to ST8. Further, the tool T15 is to be attached to ST1 and the tool T14 is to be stored into the tool magazine 10.

Subsequently, where there is a new tool (step S3), the tool change control unit 42 carries out an operation of extracting the new tool T15 from the tool magazine 10 (the extracting operation described above). On the other hand, where there is no new tool, the tool change control unit 42 proceeds to step S5. In this example, the tool change control unit 42 carries out the extracting operation so that the tool T15 is gripped and extracted by the first hand 34.

In step S5, the tool change control unit 42 checks whether there is a tool to be replaced in the turret 3. Where there is a tool to be replaced, the tool change control unit 42 carries out a tool replacing operation (step S6). On the other hand, where there is no tool to be replaced, the tool change control unit 42 proceeds to step S7.

In step S6, in the case of changing the attachment positions (stations) of n tools (in this example, 8 tools) of the tools attached to the turret 3, storing one tool (tool T14) of the n tools into the tool magazine 10, and attaching one new tool (tool T15) from the tool magazine 10 to the turret 3, the tool change control unit 42 carries out a tool replacing operation as described below. Note that n is a natural number of 2 or greater.

That is, after carrying out the above-described extracting operation, the tool change control unit 42 carries out the first exchanging operation or the second exchanging operation (hereinafter, simply referred to as "the exchanging operation") with the first hand 34 gripping the tool T15 as the first tool so that the tool T7 at ST1, to which the tool T15 is to be attached, is gripped and removed from the tool holder 4 by the second hand 35 and the tool T15 gripped by the first hand 34 is attached to the tool holder 4 at ST1.

Subsequently, the tool change control unit 42 carries out the exchanging operation so that the tool T8 at ST2, to which the tool T7 is to be attached, is gripped and removed from the tool holder 4 by the first hand 34 and the tool T7 gripped by the second hand 35 is attached to the tool holder 4 at the ST2.

Thereafter, the tool change control unit 42 repeats the exchanging operation (n−2) times so that the tool T8 at ST2 is transferred to ST3, the tool T9 at ST3 is transferred to ST4, the tool T10 at ST4 is transferred to ST5, the tool T11 at ST5 is transferred to ST6, the tool T12 at ST6 is transferred to ST7, and the tool T13 at ST7 is transferred to ST8.

Subsequently, in step S7, the tool change control unit 42 checks whether there is a tool T to be stored into the tool magazine 10. Where there is a tool T to be stored, the tool change control unit 42 carries out the tool storing operation described above and then ends the process (step S8). On the other hand, where there is no tool T to be stored, the tool change control unit 42 ends the process. In this example, in step S8, the tool change control unit 42 carries out an operation of storing the tool T14 gripped by the first hand 34 into the holding pot 12 of pot number P14 in the tool magazine 10.

As described above, the machine tool 1 according to this embodiment is not only able to carry out tool change between the tool magazine 10 and the turret 3 but also able to carry out the tool change inclusive of replacement of tools T within the turret 3. Further, carrying out the tool change inclusive of replacement of tools T within the turret 3 automatically with the tool changer 20 without relying on an operator's manual operation enables streamlining of the operation of arranging tools T in the turret 3.

Hereinbefore, a specific embodiment of the present invention has been described. However, it should be noted that the present invention is not limited to the above-described embodiment and can be implemented in other manners.

For example, the tool change control unit 42 may be configured to, when changing the attachment positions (stations) of n tools T (replacing n tools T) of the tools T attached to the turret 3, first grip and pull out with an empty first one of the tool grippers, e.g., the first hand 34, a first tool T selected from among the n tools to be transferred, subsequently carry out an operation of gripping and pulling out with an empty second one of the tool grippers, e.g., the second hand 35, a second tool T attached to a destination station to which the first tool T is to be transferred and then attaching the first tool T to the destination station, and thereafter repeat this operation (n−2) times and then attach an nth tool T to a destination station for the nth tool. Note that n is a natural number of 2 or greater.

Alternatively, the tool change control unit 42 may be configured to, when changing the attachment positions (stations) of n tools of the tools T attached to the turret 3, first grip and pull out with an empty first one of the tool grippers, e.g., the first hand 34, a first tool T selected from among the n tools to be transferred, subsequently carry out an operation of gripping and pulling out with an empty second one of the tool grippers, e.g., the second hand 35, a second tool T to be transferred to a station where the first tool T was attached and attaching the second tool T to the station where the first tool T was attached, and thereafter repeat (n−2) times an operation of gripping and pulling out with the second hand 35 an (i+1)th tool T to be transferred to a station where an ith tool T was attached and attaching the (i+1)th tool T to the station where the ith tool T was attached and then attach first tool T gripped with the first hand 34 to a station where an nth tool T was attached. Note that n is a natural number of 2 or greater and i is a natural number of 2 to (n−1).

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Machine tool
2 Tool rest
3 Turret
4 Tool holder
10 Tool magazine
12 Holding pot
20 Tool changer

12

21 Feed mechanism
30 Movable carriage
31 Holding member
34 First hand
35 Second hand
40 Controller
41 NC control unit
42 Tool change control unit
43 Tool information storage

The invention claimed is:
1. A machine tool comprising:
a tool magazine storing a plurality of tools;
a turret to which a plurality of tools are attached;
a tool changer configured to change a tool attached to the turret for a tool stored in the tool magazine; and
a tool change control unit configured to control operations of the tool magazine and the turret, wherein:
the tool changer has a first tool gripper and a second tool gripper for gripping tools and is configured to, under control by the tool change control unit, replace attachment positions of tools attached to the turret with one another using the first tool gripper and the second tool gripper.
2. The machine tool according to claim 1, wherein the tool changer is configured to, when changing attachment positions of n tools of the tools attached to the turret, first grip and pull out with the first tool gripper a first tool selected from among tools to be transferred, subsequently carry out an operation of gripping and pulling out with the second tool gripper a second tool attached to a transfer destination to which the first tool is to be transferred and then attaching the first tool to the transfer destination, and thereafter repeat the operation (n−2) times and then attach a nth tool to a transfer destination for the nth tool,
where n is a natural number of 2 or greater.
3. The machine tool according to claim 2, wherein the tool changer is configured to be able to turn the first tool gripper and the second tool gripper about an axis of rotation perpendicular to a longitudinal direction of a tool gripped with each of the first tool gripper and the second tool gripper.
4. The machine tool according to claim 1, wherein the tool changer is configured to be able to turn the first tool gripper and the second tool gripper about an axis of rotation perpendicular to a longitudinal direction of a tool gripped with each of the first tool gripper and the second tool gripper.
5. The machine tool according to claim 1, wherein the tool changer is configured to, when changing attachment positions of n tools of the tools attached to the turret, first grip and pull out with the first tool gripper a first tool selected from among tools to be transferred, subsequently carry out an operation of gripping and pulling out with the second tool gripper a second tool to be transferred to a position where the first tool was attached and attaching the second tool to the position where the first tool was attached, and thereafter repeat (n−2) times an operation of gripping and pulling out with the second tool gripper an (i+1)th tool to be transferred to a position where an ith tool was attached and attaching the (i+1)th tool to the position where the ith tool was attached and then attach the first tool gripped with the first tool gripper to a position where an nth tool was attached,
where n is a natural number of 2 or greater and i is a natural number of 2 to (n−1).
6. The machine tool according to claim 5, wherein the tool changer is configured to be able to turn the first tool gripper and the second tool gripper about an axis of rotation per- pendicular to a longitudinal direction of a tool gripped with each of the first tool gripper and the second tool gripper.

* * * * *